United States Patent [19]

Dezonno

[11] Patent Number: 5,400,327
[45] Date of Patent: Mar. 21, 1995

[54] AUTOMATIC CALL DISTRIBUTOR WITH WIRELESS CONNECTION WITH REMOTE UNIT AND METHOD

[75] Inventor: Anthony J. Dezonno, Downers Grove, Ill.

[73] Assignee: Rockwell International Corporation, El Segundo, Calif.

[21] Appl. No.: 129,714

[22] Filed: Sep. 30, 1993

[51] Int. Cl.⁶ .................. H04L 12/12; H04L 12/16; H04M 3/42
[52] U.S. Cl. .................... 370/62; 370/95.1; 379/58; 379/210
[58] Field of Search ............. 370/95.1, 58.1, 95.3, 370/58.2, 62, 60, 60.1; 379/58, 59, 61, 157, 210, 211, 212, 214

[56] References Cited

U.S. PATENT DOCUMENTS

| | | | |
|---|---|---|---|
| 4,656,623 | 4/1987 | Dalby, Jr. et al. | 370/60 |
| 4,893,301 | 1/1990 | Andrews et al. | 370/58.2 |
| 5,073,890 | 12/1991 | Danielsen | 370/58.2 |
| 5,086,451 | 2/1992 | Saegusa et al. | 379/58 |
| 5,235,632 | 8/1993 | Raith | 379/58 |
| 5,265,150 | 11/1993 | Helmkamp et al. | 379/58 |

Primary Examiner—Wellington Chin
Attorney, Agent, or Firm—C. B. Patti; H. F. Hamann

[57] ABSTRACT

An automatic call distribution system (10) with a computer controlled (14) multiport switch (12) provided with groups of remote data terminals (56) and remote internal telephonic units (54) which communicate with local data terminals (28), local internal telephonic units (22) and external telephonic units (18) of an external telephonic network (20) through the multiport switch (12) by means of local and remote internal telephonic multiplexing equipment (38 and 52) and local and remote wireless transceivers (44 and 48) to enable wireless expansion of the system (10) with the addition of remote units (54 and 56).

47 Claims, 3 Drawing Sheets

AUTOMATIC CALL DISTRIBUTOR WITH WIRELESS CONNECTION WITH REMOTE UNIT AND METHOD

BACKGROUND OF THE INVENTION

1. Field of the Invention

This invention relates generally to the field of automatic call distributor systems and more particularly to such call distributor systems which remotely communicate.

2. Description of the Related Art Including Information Disclosed Under 37 C.F.R. §1.97–1.99

Automatic call distribution systems employing a multiport switch controlled by a central processing unit for selectively interconnecting a plurality of external telephonic units of an external telephonic network with internal telephonic units of the call distribution system are well known. Examples of such call distributor systems are shown in patent application U.S. Ser. No. 07/770,197 of Jones et al. entitled "Multichannel Telephonic Switching Network With Different Signaling Formats and Connect/PBX Treatment Selectable For Each Channel", filed Oct. 2, 1991; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992 and U.S. Pat. No. 5,127,004 of Lenihan et al. entitled "Tone and Announcement Message Code Generator for a Telephonic Switching System and Method", issued Jun. 30, 1992.

It is known for automatic call distributor systems to communicate with each other from remote locations. Automatic call distributors often answer thousands of income producing calls in a single day. In an automated call distribution environment, such as in the telemarketing industry, seasonal variations in the number of incoming telephonic calls affects the proper size of an automatic call distributor center. Large increases of call volume may be answered. Due to the physical space limitations, employing additional agents at internal telephonic units of the call center facility is not always possible. Accordingly, to overcome this problem, it has been known to send the incoming calls to a call center facility to another facility at a remote location.

Catastrophic occurrences at a local automatic call distributor system sometimes result in the need for quickly establishing automatic call distribution communication centers at remote sites. If flooding, fires or the like at a local automatic call distribution center ruin the internal telephonic units necessary to handle incoming calls, or makes the facility uninhabitable, the call distribution center cannot be used to handle calls from the external telephonic network even though the switching equipment at the center is still functional. Disadvantageously, in known automatic call distributor systems, communication connections between a local site and a remote site are done through the use of expensive copper wiring connections which are time consuming to install.

In known automatic distribution systems, communication with remote locations is done across a dedicated T-line. A T-line is a digital transmission link with a capacity of 1.544 Megabits per second. A T-1 line uses two pairs of twisted wires and can carry twenty-four voice conversations, each one digitized at sixty-four Kbits per second. Channel banks produced by a variety of manufacturers such as Pulsecom and Charles Industries, provide a channelized access to individual channels on a digitally encoded T-1 line. A channel bank is a multiplexing device which puts many slow speed voice or data conversations onto a single high-speed link such as a T-1 line. When the channel bank is equipped with circuit cards manufactured by companies such as American Telephone and Telegraph or Adtran Inc., both Integrated Services Digital Network (ISDN) circuits and data terminal connections are possible over the copper wire T-1 line from the automatic call distributor. The installation of T-1 lines, though, presents a number of financial and logistic problems.

The installation of a hard wire T-line, done by a telephone operating company, is achieved by interconnecting two locations in a point to point arrangement. Upon payment for the installation, a monthly access charge is accessed for use of the line. Logistically, the time required to set up T-1 lines for call center use negatively impacts the financial earnings of the call center. Thousands of income producing calls may not be answered for each day of installation of the T-1 line. Therefore, communication with remote locations is both time consuming and costly in known call distribution systems despite the presence of ISDN standards and hardware.

SUMMARY OF THE INVENTION

It is therefore a principal object of the present invention to provide an automatic call distributor and method in which the disadvantages of known call distributors noted above are overcome by providing means and methods for selectively establishing wireless communication between a remote internal telephonic unit and an external telephonic unit through a multiport switch.

This object is achieved by provision of an automatic call distributor, comprising a computer controlled multiport switch with a plurality of communication ports through which communication links are established with external telephonic units of an external telephonic network coupled with the multiport switch, a remote internal telephonic unit at a remote location and means for selectively establishing wireless communication between the remote internal telephonic unit and one of the external telephonic units through a selected one of the communication ports of the multiport switch.

Preferably, an automatic call distributor has a communication link establishing means connected with the group of remote internal telephonic units including a remote transceiver at the remote location for sending and receiving radio waves and remote time division multiplexing equipment at the remote location switching means including means for demultiplexing signals received by the remote transceiver before being provided to the remote internal telephonic units and means for multiplexing signals from the plurality of remote internal telephonic units before sent by the transceiver.

Obtainment of the object of the invention is achieved by provision of an automatic call distributor, comprising a computer controlled multiport switch with a plurality of communication ports through which communication links are established with external telephonic units of an external telephonic network coupled with the multiport switch, a data terminal at a remote location, means for selectively establishing wireless communication between the data terminal and one of the external telephonic units through a selected one of the communication ports of the multiport switch.

Preferably, such automatic call distributor has a communication link establishing means connected with the group of remote data terminals including a remote transceiver at the remote location for sending and receiving radio waves and a remote time division multiplexing equipment at the remote location switching means including means for demultiplexing signals received by the remote transceiver before being provided to the remote data terminals and means for multiplexing signals from the plurality of remote data terminals before sent by the transceiver.

Also, the object of the invention is further achieved by provision of a method of distributing calls from external telephonic units of an external telephonic network to internal telephonic units of an automatic call distributor having a multiport switch, comprising the steps of (a) selectively associating a call from an external telephonic unit received at the multiport switch with a preselected port and (b) wireless transceiving signals between the preselected port and a remote station to establish a wireless communication link between the external telephonic network and a remote internal telephonic unit at the remote station.

Preferably, this method includes the step of multiplexing the signals before being transceived to simultaneously establish a wireless communication link between a plurality of external telephonic units and a plurality of remote internal telephonic units at the remote station.

Moreover, the object of the invention is achieved by providing a method of distributing calls from external telephonic units of an external telephonic network with internal telephonic units of an automatic call distributor having a multiport switch, comprising the steps of (a) establishing communications between the external telephonic units and the internal telephonic units through the multiport switch, (b) selectively associating signals relating the functioning of the multiport switch with a data port of a central processing unit of the call distributor and (c) wireless transceiving signals between the preselected data port and a remote station to establish a wireless communication link between the preselected data port and a remote data terminal at the remote location.

In the preferred embodiment, this method includes the step of multiplexing the signals before being transceived to simultaneously establish a wireless communication link between the data port and a plurality of remote internal data terminals at the remote location.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
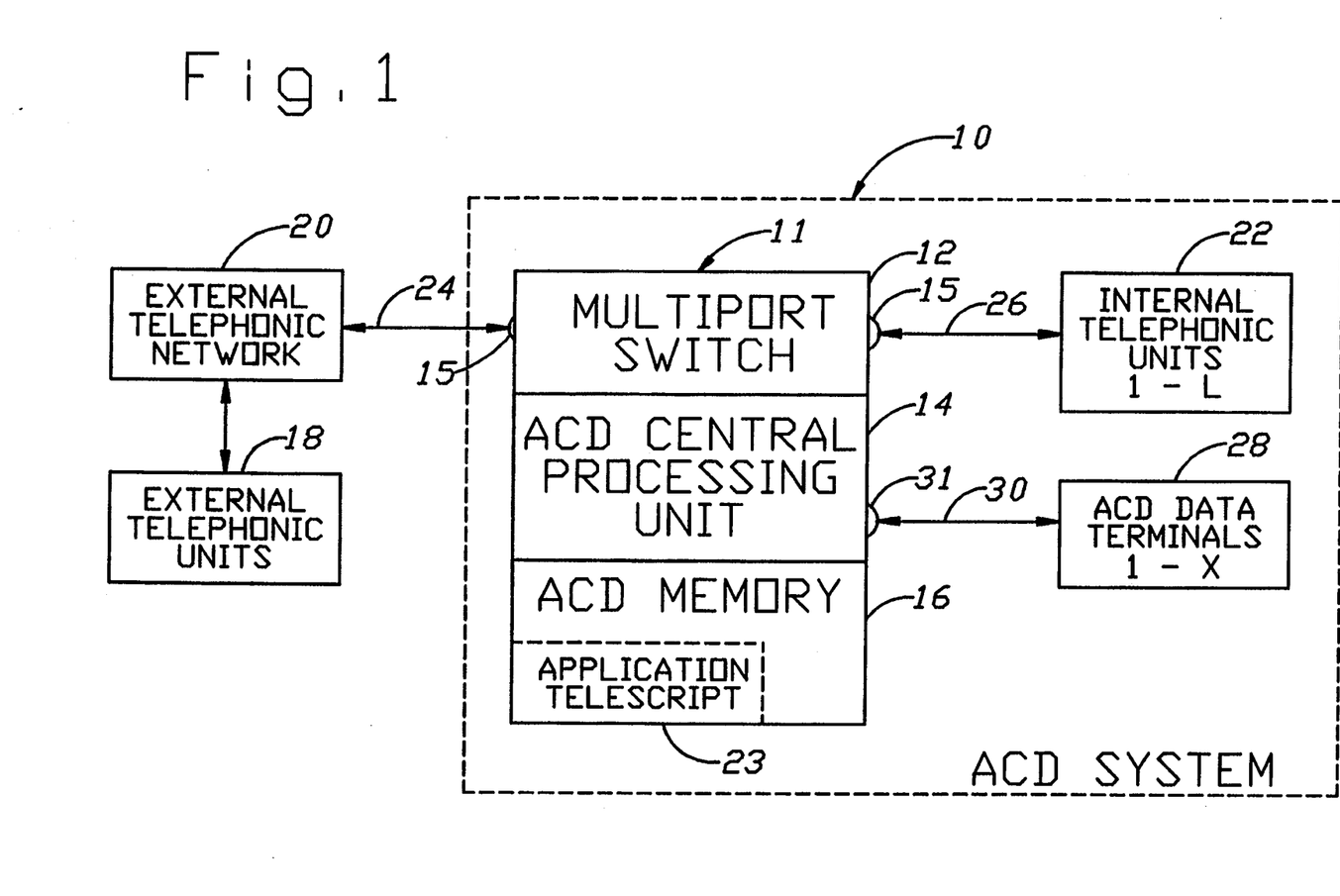
FIG. 1 is a functional block diagram of the automated call distribution system as connected with an external telephonic network.

Referring to FIG. 1, automatic call distributor system 10 is shown having automatic call distributor 11 with multiport switch 12 having a plurality of communication ports and computer controlled by central processing unit 14 in conjunction with main memory 16 for selectively interconnecting a plurality of external telephonic units 18 of an external telephonic network 20 with a plurality of interior telephonic units 22 of the call distributor system 10. The computer controlled multiport switch 12 has a plurality of communication ports 15 through which communication links with the external telephonic units 18 coupled with the switch and the internal telephonic units. The main memory 16 of the automatic call distributor 11 includes application telescripts 23 which define the characteristics for the routing of telephonic calls received at the multiport switch 12. The application telescripts coordinate the routing of telephonic calls received from the external telephonic units 18 to an agent or a group of agents located at the internal telephonic units 22 of the call distributor system 10. Preferably, the interior telephonic units 22 are Integrated Service Digital Network (ISDN) based telephonic devices. Reference can be made to U.S. patent application Ser. No. 07/976,630 of Dezonno et al. entitled "Automatic Call Distribution System With an ISDN Compatible Call Connection System and Method" filed Nov. 16, 1992, for further details on the functionality of the ISDN based interior telephonic units 22.

The multiport switch 12 of the automatic call distributor 11 (ACD) connects with the external telephonic network 20 over standard telephonic interface lines or trunks 24. The automatic call distributor 11 determines via an application routing program of the application telescripts 23 which internal telephonic units 22 or groups of units receive telephonic calls over an ISDN Basic Rate electrical interface 26 received from the external telephonic units 18 and other internal telephonic units of the ACD system 10. The ACD application routing program is preferably the SPECTRUM ® System ACD application routing program as described in SPECTRUM ® SYSTEM Administration Volume I, Part No. RV-2905001-2 Revision 8, Copyright 1993. (SPECTRUM ® is a registered trademark of Rockwell International Corporation). Generally while the automatic call distribution system of the present invention can be implemented in numerous types and sizes of call distributors, it is preferably employed in an automatic call distributor of the type shown in patent application U.S. Ser. No. 07/770,197 of Jones et al. entitled "Multichannel Telephonic Switching Network With Different Signaling Formats and Connect/PBX Treatment Selectable For Each Channel", filed Oct. 2, 1991; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No 4,627,047 of Pitroda et al. entitled "Integrated Voice and Data Telecommunications Switching System", issued Dec. 2, 1986.

Data terminals 28 connect to the ACD 11 through a plurality of data ports 31 of the ACD control computer 5 or central processing unit 14 over standard serial data communication lines 30 referred to as RS-232C which provide bidirectional flow of data between the ACD control computer 14 and the data terminals. The ACD data terminals 28 provide a system interface for supervisory overview of the ACD system 10 real time statistics and to program operations in the automatic call distributor.

Figure 2:
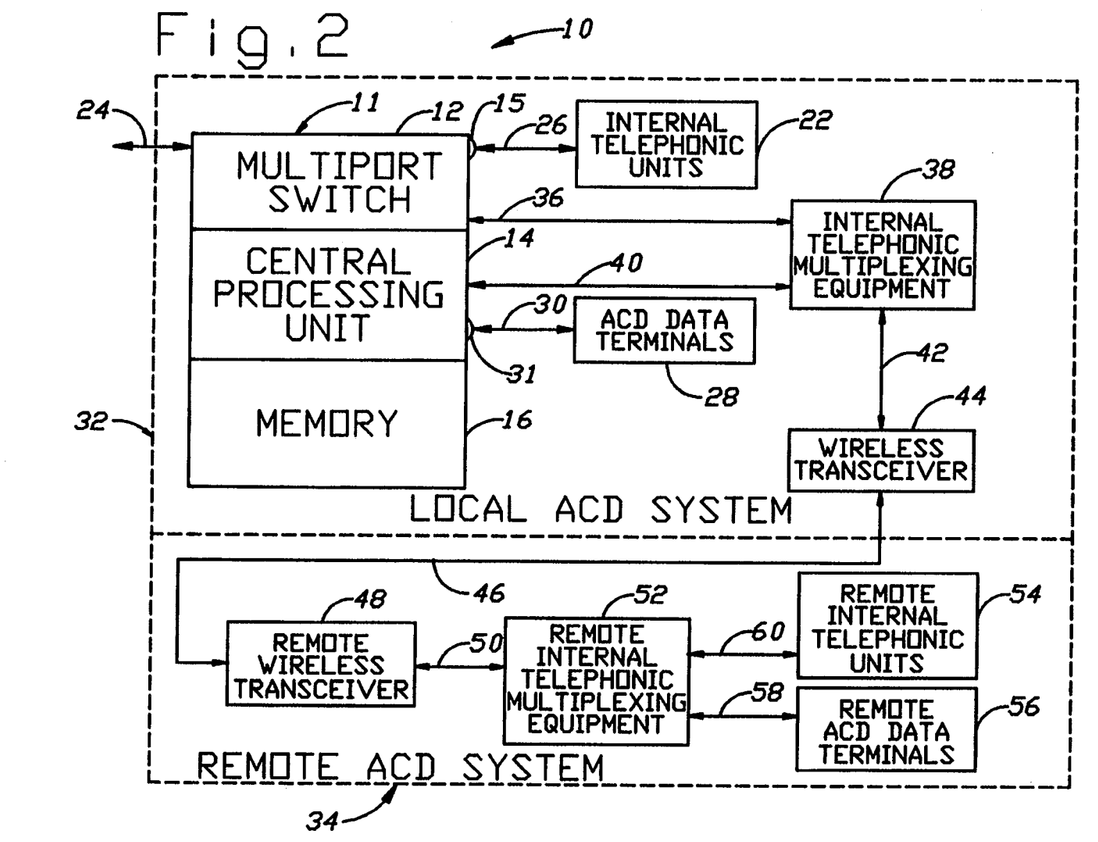
FIG. 2 is a functional block diagram of the preferred embodiment of an automatic call distribution system of the present invention illustrating wireless communication between the automatic call distributor and remote internal telephonic units and remote data terminals at a remote location.

Referring now to FIG. 2, the automatic call distributor system 10 is illustrated as a decomposition at differing physical locations where the handling of calls from external telephonic units occurs both at a local ACD system 32 having the automatic call distributor 11 and a remote ACD system 34 which does not have an ACD. In the local ACD system 32, the internal telephonic units 22 receive calls in the manner described above in FIG. 1.

In the remote automated call distributor system 34, when calls arrive from the external telephonic network 20, FIG. 1, the automatic call distributor 11, FIG. 2, of the local ACD system 32, the calls are routed through the ACD application routing algorithm of the ACD main memory 16 to determine which internal telephonic unit is to receive the call. The call is then connected from the ACD 11 over ISDN line interface 36 through internal telephonic multiplexing equipment 38 which multiplexes the ISDN line 36 data on a time division multiplexing basis along standard RS-232C communication lines 40 onto a T-1 line 42. The multiplexing of the ISDN lines 36 onto a T-1 line 42 is referenced by Bellcore document number TR-NWT-00397 entitled ISDN Basic Access Transport System Requirements. A wireless broadcasting transceiver 44 connects to the T-1 line 42 from the internal multiplexing 38 to wirelessly transmit over antennas 48 to a corresponding wireless remote transceiver 48 at the remote ACD system 34. Preferably, the wireless transceivers 44, 48 are Lynx brand transceiver models manufactured by Western Multiplex Corporation.

The remote wireless transceiver 48 at the remote ACD system 34 formats the received data at the antenna 46 onto a different T-1 line 50 which connects to remote internal telephonic multiplexing equipment 52 which demultiplexes the channels on the T-1 line 50 into distinct channels. Remote internal telephonic units 54 connect to the remote internal telephonic multiplexing equipment 52 to receive the inbound call from the external telephonic network trunks 24. Likewise, remote ACD data terminals 56 at the remote location also connect over a standard RS-232 communications line 58 into the remote internal telephonic multiplexing equipment 52 to receive data from the RS-232 communication lines 40 at the local ACD system 32.

Preferably, the wireless transmission of signals is done through the employment of spread spectrum broadcast technology. Spread spectrum is a modulation technique in which information is spread over a wider bandwidth than the frequency content of the original information. The wireless transceiver 44, 48 in the preferred embodiment utilize spread spectrum broadcast technology to cost effectively enable radio frequency transmission of the multiplexed signals received from the telephonic multiplexing equipment 38 and 52 at different locations. Spread spectrum radio broadcast technology transmits data to a remote location over a wide band of frequencies. Spread spectrum enables the receiver to be less dependent on the natural characteristics of a given single radio frequency.

The transmission of voice and data between the wireless transceiver 44 at the local location of the automatic call distributor 11 and the remote wireless transceiver 44 at the remote location enables the automatic call distribution system 10 to establish wireless communication between groups of remote internal telephonic units 54 and the external telephonic units 18, FIG. 1, through a selected communication port 15 of the multiport switch 12. The remote internal telephonic multiplexing equipment 52, FIG. 2, at the remote location 34 in conjunction with the wireless transceivers 44 and 48 and the internal telephonic multiplexing equipment establishes a communication link between the remote telephonic units 54 and the external telephonic units 18, FIG. 1, on a time division multiplexing basis. The wireless communication is performed by the remote transceiver 48 sending and receiving radio waves to and from the local wireless transceiver 44. The signals received by the remote telephonic units 54 are demultiplexed at the remote telephonic multiplexing equipment prior to being sent to the remote units. Furthermore, signals sent by the remote internal telephonic units are multiplexed at the remote internal telephonic multiplexing equipment 52 prior to the signal transmission by the remote wireless transceiver 48.

The ACD control computer 14 allows the internal telephonic units 22 and the remote internal telephonic units 54 the capability of directly calling any of the telephonic units connected within the automated call distribution system 10. Completing a call from one remote internal telephonic unit 54 to another remote telephonic unit is done by the originating remote telephone unit dialing the extension address of the terminating remote telephonic unit 17.

The keypad dialed extension address from the originating remote internal telephonic unit 54 is transmitted as an ISDN message over ISDN line interface 60 and is multiplexed by the remote internal telephonic multiplexing equipment 52 onto T-1 line 50 to the remote wireless transceiver 48 of the remote ACD system 34. The spread spectrum radio broadcast signal is received by the local ACD system 32 wireless transceiver 44, communicated onto a T-1 line signal 42, demultiplexed into a ISDN basic rate message by the internal telephonic multiplexing equipment 38, multiplexed onto a T-1 line 42, which is then broadcast through radio transmission by the wireless transceiver 42 (through antennas and air 46) of the local ACD system 32 to the corresponding remote wireless transceiver 48 at the remote ACD system 34. The message then is multiplexed onto remote T-1 line 50 from the remote wireless transceiver 48, connecting to the internal telephonic multiplexing equipment 52, where it is demultiplexed into the appropriate ISDN line interface 60 connecting to the dialed remote ISDN internal telephonic unit 54 to indicate the arrival of an incoming call.

Completing a call from a remote internal ISDN telephonic unit 54 to a local ACD system 32 ISDN internal telephonic unit 22 is begun by the originating remote internal telephonic unit 54 dialing the extension address of the local internal telephonic unit 22 at the local ACD system.

The keypad dialed extension address from the originating remote telephonic unit 54 is transmitted as an ISDN message over the ISDN line interface 60 and is multiplexed by the remote internal telephonic multiplexing equipment 52 onto a T-1 line 50 to the remote wireless transceiver 48 of the remote ACD system 34. The spread spectrum radio broadcast signal is received by the local ACD system 32 wireless transceiver 44, communicated onto a T-1 line signal 42, demultiplexed into an ISDN basic rate message by the internal telephonic multiplexing equipment 38 and sent over an ISDN interface line 36 to the automated call distributor 11. Upon interpreting the ISDN message from the remote internal telephonic unit 54, a call connection path is created in the multiport switch 12, and an ISDN message is sent over the appropriate ISDN interface 26 to the ISDN telephonic unit 38 in the local ACD system 32 to indicate the arrival of an incoming call.

Data is transmitted from the remote ACD data terminals 56 in a similar wireless fashion to the automatic call distributor 11 of the local ACD system 32. Data from the remote data terminals is sent to the remote internal multiplexing equipment 52 where it is multiplexed and carried to the remote radio transceiver 48. The spread spectrum broadcast signal transmitted from the remote wireless transceiver 48 is received at the wireless transceiver 44 at the local site. The internal telephonic multiplexing equipment 38 demultiplexes the received data signal and the data is sent to the central processing unit 14 of the automatic call distributor 11. Likewise, data sent from the ACD data terminals 28 to the central processing unit 14 of the ACD 11 is transmitted in the same wireless fashion via the internal telephonic multiplexing equipment 38, the wireless transceiver, the remote wireless transceiver 48 and the remote internal telephonic multiplexing equipment 52.

Multiple remote ACD systems 34 connect to the local ADC system 32 by the local ACD system having the internal telephonic multiplexing equipment 38 and wireless transceiver 42 combination for communication to each of a plurality of remote ACD systems 34 over corresponding equipment. Call connections are done as described above in the multiport switch 12 of the automated distributor 11 at the local ACD system location 32 for all call connections in the automated call distributor system 10.

Figure 3:
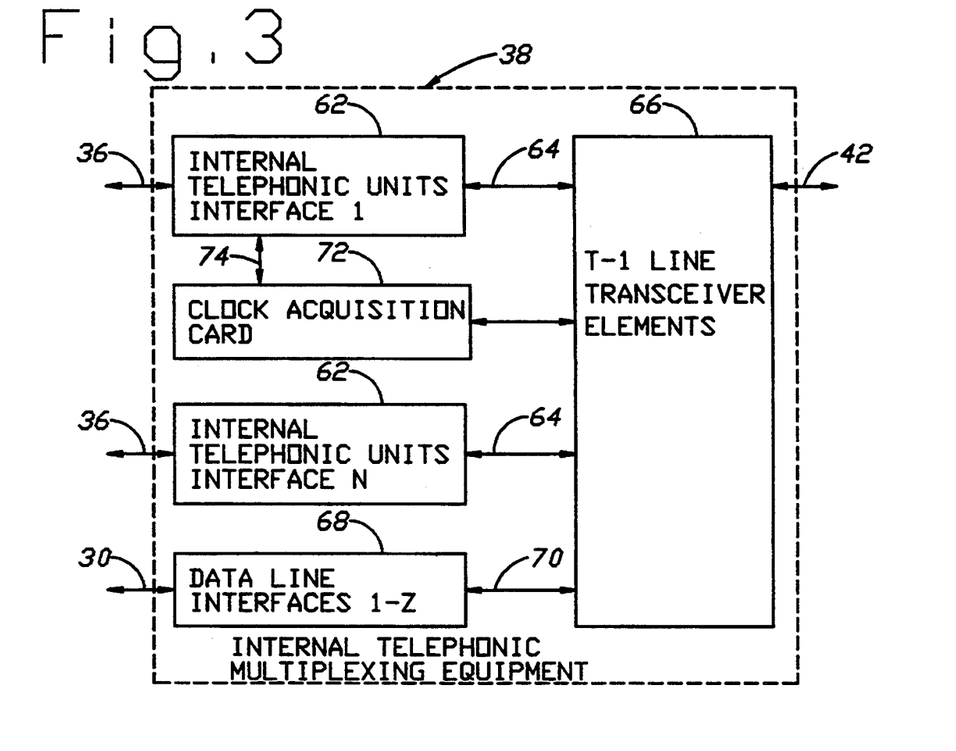
FIG. 3 is a functional block diagram of the preferred embodiment of the internal telephonic multiplexing equipment of FIG. 2.

FIG. 3 illustrates the elements for the internal multiplexing equipment 38 and the remote internal multiplexing equipment 52. In the preferred embodiment of the present invention, the same elements for the remote internal telephonic multiplexing equipment 52 at the remote ACD system 34 is used as in the internal telephonic multiplexing equipment 38 at the local ACD system site 32. For brevity and to avoid redundancy the internal telephonic multiplexing equipment 38 at the local ACD 32 shall be described herein. This equipment is commonly referred to as channel bank equipment. The internal telephonic multiplexing equipment 38 has the capacity to have twenty-four cards inserted, where each card receives the corresponding channel number of the T-1 line 42. The ISDN telephonic unit interface cards 62 insert into card slots in the channel bank and perform the function of putting the two ISDN Basic Rate "B" channels and one ISDN Basic Rate "D" channel contained on the ISDN line interface 36 into three sequential channels as referenced by BellCore document number TR-NWT-00397 titled ISDN Basic Access Transport System Requirements, through a connection 64 to the T-1 line transceiver elements 66 of the internal telephonic multiplexing equipment 38. As a result of requiring three channels for the information of the ISDN line 36, the next two card slots of the channel bank must not contain cards sending information for a channel on the T-1 line 42 since the ISDN telephonic unit interface card 62 is already communicating data on those channels.

Likewise, data line interface cards 68 also insert into card slots in the channel bank and perform the function of putting the RS-232C communications interface line 30 data through a connection 70 to the T-1 line transceiver elements 66 of the internal telephonic multiplexing equipment 38.

The digitally encoded signals 64 and 70 are combined together by the T-1 line transceiver elements 66 into a standard T-1 line 42 format as described by Bellcore Tr-TSY-000499 and American Telephone and Telegraph publication 62411. The same type of card inserted, either data interface card 68 or ISDN telephonic unit interface 62, is inserted in the corresponding slot number at the remote internal telephonic multiplexing equipment 52 at the remote ACD system 34 of FIG. 2.

A clock acquisition card 72, FIG. 3, connects in the internal telephonic multiplexing equipment 38 and connects to the first ISDN telephonic interface card 62 via line 74 to perform the function of clock synchronization of the incoming ISDN line 36 clock to the outgoing digitally encoded channels on connection line 64 of the ISDN telephonic unit interface card 62. Preferably, the ISDN based internal telephonic unit interface card 62 is a TBR1TE brand model number 110019L1 and the clock acquisition unit card 72 is a model CAU1100023L1, both manufactured by Adtran Inc. The data line interfaces 68 preferably are model DSU-DP3 with the T-1 transceiver elements 66 and the overall enclosure of the local and remote internal telephonic multiplexing equipment and model BB-24 or BB-48 channel banks manufactured by Pulse Communications Inc.

Figure 4:
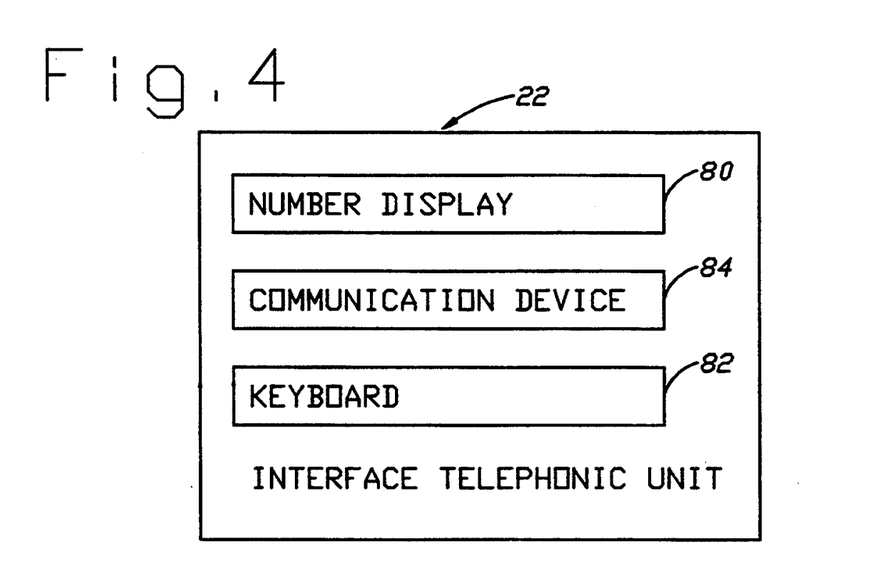
FIG. 4 is a functional block diagram of an internal telephonic unit.

Referring now to FIG. 4, the internal telephonic units 22 and remote internal telephonic units 54 are ISDN based instruments which include a telephone number display 80, a keyboard, or keypad, 82 for communicating with the automatic call distributor 11, FIG. 1, and a telephone communication device 84, such as a telephone headset for communicating with the callers. The ISDN internal telephonic unit 22 and remote telephonic unit 54 can receive, as well as make call connections through the programming of the automated call distributor 14.

While the advantages of the invention are preferably obtained with the automatic call distributor system 10 described above with reference to FIGS. 1-4, the method of the invention can be practiced with any other automated call distributor systems for distributing calls from external telephonic units of an external telephonic network to internal telephonic units of an automatic call distributor having a multiport switch. In any event, the preferred method of practicing the invention comprises the steps of (1) selectively associating a call from an external telephonic unit received at the multiport switch with a preselected port, and (2) wirelessly transceiving signals between the preselected port and a remote station to establish a wireless communication link between the external telephonic network and a remote internal telephonic unit at the remote station.

Also, a method is provided of distributing calls comprising the steps of (1) establishing communications between the external telephonic units and the internal telephonic units through the multiport switch, (2) selectively associating signals relating the functioning of the multiport switch with a data port of the multiport switch, and (3) wireless transceiving signals between the preselected data port and a remote station to establish a wireless communication link between the preselected data port and a remote data terminal at the remote location.

The method of distributing calls is done in the automatic call distribution system 10, FIG. 2, through the internal telephonic multiplexing equipment 38 multiplexing the call signals received from a communication port of the multiport switch 12 before being transceived by the wireless transceiver 44 to the remote wireless transceiver 48 to establish a wireless communication link between the external telephonic units 18, FIG. 1, and the remote internal telephonic units 54 at the remote station 34 of the ACD system 10. The wireless transmission between the wireless transceiver 48 is performed by transmitting radio waves on a spread spectrum basis.

Furthermore, signals relating to the functioning of the multiport switch 12 are associated with a data port 31 of the central processing unit 14 controlling the switch. The signals are transceived in a wireless fashion between the preselected port of the switch and a remote ACD station 34 to establish a wireless communication link between the data port 31 and a remote internal data terminal 56 at the remote station. The signals transceived between the data port 31 and the remote station 34 are multiplexed by the internal telephonic multiplexing equipment 38 before being transceived to simultaneously establish a wireless communication link between the data port and the remote data terminals 56.

While a detailed description of the preferred embodiment of the invention has been given, it should be appreciated that many variations can be made thereto without departing from the scope of the invention as set forth in the appended claims.

I claim:

1. An automatic call distributor, comprising:
   a computer controlled multiport switch with a plurality of communication ports through which communication links are established with external telephonic units of an external telephonic network coupled with the multiport switch;
   a remote internal telephonic unit at a remote location;
   a plurality of other remote internal telephonic units located together at the remote location with said one remote internal telephonic unit to form a group of remote internal telephonic units; and
   means for selectively establishing wireless communication between the remote internal telephonic unit and one of the external telephonic units through a selected one of the communication ports of the multiport switch, the wireless communication establishing means including means at the remote location connected with the group of remote internal telephonic units at the remote location for selectively establishing a communication link between any of the plurality of remote internal telephonic units and any of the external telephonic units on a time division multiplexing basis.

2. The automatic call distributor of claim 1 in which said communication link establishing means connected with the group of remote internal telephonic units includes
   a remote transceiver at the remote location for sending and receiving radio waves, and
   remote time division multiplexing equipment at the remote location switching means including
      means for demultiplexing signals received by the remote transceiver before being provided to the remote internal telephonic units, and
      means for multiplexing signals from the plurality of remote internal telephonic units before sent by the transceiver.

3. The automatic call distributor of claim 2 in which said wireless communication establishing means includes means at the local location connected with the multiport switch for establishing a wireless communication link between a plurality of external telephonic units connected to the multiport switch and the group of remote telephonic units on a time division multiplexing basis.

4. The automatic call distributor of claim 3 in which said means at the local location for establishing a wireless communication link includes
   a local wireless transceiver at the local location for sending and receiving radio waves, and
   local time division multiplexing equipment at the local location and connected with the local wireless transceiver including
      means for demultiplexing signals received from the remote telephonic units through the local wireless transceiver, and
      means for multiplexing signals sent by the local wireless transceiver to the remote transceiver and the group of remote telephonic units.

5. The automatic call distributor of claim 1 in which said wireless communication establishing means includes means at the local location connected with the multiport switch for establishing a communication link between selected ones of the plurality of external telephonic units connected to the multiport switch and the group of remote telephonic units on a time division multiplexing basis.

6. The automatic call distributor of claim 5 in which said means at the local location for establishing a wireless communication link includes
   a local wireless transceiver at the local location for sending and receiving radio waves, and
   local time division multiplexing equipment at the local location and connected with the local wireless transceiver including
      means for demultiplexing signals received from the remote telephonic units through the local wireless transceiver, and
      means for multiplexing signals sent by the local transceiver to the remote wireless communication establishing means and the group of remote telephonic units.

7. The automatic call distributor of claim 1 in which said selective wireless; communication establishing means includes means at the local location and connected with the multiport switch for establishing a communication link between the plurality of remote internal telephonic units and the external telephonic units and the external telephonic units on a time division multiplexing basis.

8. The automatic call distributor of claim 1 in which said wireless communication establishing means includes means for establishing communication on a spread spectrum broadcast basis.

9. The automatic call distributor of claim 1 including a plurality of local internal telephonic units wire connected with ports of the multiport switch.

10. The automatic call distributor of claim 1 in which said plurality of remote internal telephonic units of the remote location are all associated with a single port of the multiport switch.

11. The automatic call distributor of claim 1 including another remote internal telephonic unit, and in which said selective wireless communication establishing means includes means for selectively establishing wireless communication between the one and the other remote internal telephonic units through the computer controlled multiport switch.

12. The automatic call distributor of claim 11 in which the one and the other remote internal units are at different locations respectively associated with different ports of the multiport switch and said communication between the one and the other remote internal units passes through said different ports.

13. The automatic call distributor of claim 11 in which the one and the other remote internal units are at the same location associated with the selected one of the communication ports and said communication between the one and the other remote internal telephonic units passes through the selected one of the ports.

14. The automatic call distributor of claim 1 including
a local internal telephonic unit connected with a port of the multiport switch, and in which
said selectively establishing means includes means for selectively establishing wireless communication between the remote internal telephonic unit and the local internal telephonic unit.

15. An automatic call distributor, comprising:
a computer controlled multiport switch with a plurality of communication ports through which communication links are established with external telephonic units of an external telephonic network coupled with the multiport switch;
a data terminal at a remote location;
a plurality of other remote data terminals located together at the remote location with said one remote data terminal to form a group of remote data terminals;
means for selectively establishing wireless communication between the data terminal and one of the external telephonic units through a selected one of the communication ports of the multiport switch, the wireless communication establishing means including means at the remote location connected with the group of remote data terminals at the remote location for selectively establishing a communication link between any of the plurality of remote data terminals and any of the external telephonic units on a time division multiplexing basis.

16. The automatic call distributor of claim 15 in which said communication link establishing means connected with the group of remote data terminals includes
a remote transceiver at the remote location for sending and receiving radio waves, and
remote time division multiplexing equipment at the remote location switching means including
means for demultiplexing signals received by the remote transceiver before being provided to the remote data terminals, and
means for multiplexing signals from the plurality of remote data terminals before sent by the transceiver.

17. The automatic call distributor of claim 16 in which said wireless communication establishing means includes means at the local location connected with the multiport switch for establishing a wireless communication link between the multiport switch and the group of remote data terminals on a time division multiplexing basis.

18. The automatic call distributor of claim 17 in which said means at the local location for establishing a wireless communication link includes
a local radio transceiver at the local location for sending and receiving radio waves, and
a local time division multiplexing equipment at the local location and connected with the local wireless transceiver including
means for demultiplexing signals received from the remote data terminals through the local wireless transceiver, and
means for multiplexing signals sent by the local transceiver to the remote transceiver and the group of remote data terminals.

19. The automatic call distributor of claim 15 in which said wireless communication establishing means includes means at the local location connected with the multiport switch for establishing a communication link between the multiport switch and the group of remote data terminals on a time division multiplexing basis.

20. The automatic call distributor of claim 19 in which said means at the local location for establishing a wireless communication link includes
a local wireless transceiver at the local location for sending and receiving radio waves, and
local time division multiplexing equipment at the local location and connected with the local wireless transceiver including
means for demultiplexing signals received from the remote data terminals through the local wireless transceiver, and
means for multiplexing signals sent by the local transceiver to the remote wireless communication establishing means and the group of remote data terminals.

21. The automatic call distributor of claim 15 in which said wireless communication establishing means includes means for establishing communication on a spread spectrum broadcast basis.

22. The automatic call distributor of claim 15 wherein the plurality of local data terminals are wire connected with ports of the multiport switch.

23. The automatic call distributor of claim 15 all of the plurality of remote data terminals of the remote location are associated with a single port of the multiport switch.

24. The automatic call distributor of claim 15
in which
said selective wireless communication establishing means includes means for selectively establishing wireless communication between the one remote data terminal and a selected other one of the plurality of other remote data terminals through the computer controlled multiport switch.

25. The automatic call distributor of claim 24 in which the one and the selected other remote data terminals are at different locations respectively associated with different data ports of the multiport switch and said communication between the one and the other remote data terminals passes through said different data ports.

26. The automatic call distributor of claim 24 in which the one and the selected other remote data terminals are at the same location associated with the selected one of the data ports and said communication between the one and the other remote data terminals passes through the selected one of the data ports.

27. The automatic call distributor of claim 15 including
a local data terminal connected with a data port of the multiport switch, and in which
said selectively establishing means includes means for selectively establishing wireless communication between the local data terminal and at least one of the remote data terminals.

28. A method of distributing calls from external telephonic units of an external telephonic network to internal telephonic units of an automatic call distributor having a multiport switch, comprising the steps of:
selectively associating a call from an external telephonic unit received at the multiport switch with a preselected port;
wireless transceiving signals between the preselected port and a remote station to establish a wireless communication link between the external telephonic network and a remote internal telephonic unit at the remote station;
associating signals relating to the functioning of the multiport switch with a data port of a central processing unit controlling the multiport switch;
wireless transceiving signals between the preselected port and a remote station to establish a wireless communication link between the data port and a remote internal data terminal at the remote station; and
multiplexing the signals transceived between the data port and the remote station before being transceived to simultaneously establish a wireless communication link between the data port and a plurality of remote data terminals at the remote station.

29. The method of claim 28 including the step of multiplexing the signals before being transceived to simultaneously establish a wireless communication link between a plurality of external telephonic units and a plurality of remote internal telephonic units at the remote station.

30. The method of claim 28 in which said step of wireless transmitting is performed by transmitting radio waves.

31. The method of claim 30 in which the step of radio transmitting is performed by radio transmitting on a spread spectrum basis.

32. The method of claim 28 including the step of selectively establishing wireless communication between the remote internal telephonic unit and another remote internal telephonic unit through the computer controlled multiport switch.

33. The method of claim 32 including the step of respectively associating with different ports of the multiport switch and said communication between the remote internal telephonic unit and the other remote internal unit passing through said different ports.

34. The method of claim 32 including the step of associating with the selected one of the communication ports and said communication between the one and the other remote internal telephonic units passing through the selected one of the ports.

35. The method of claim 28 including the steps of:
connecting a local internal telephonic unit with a port of the multiport switch, and
selectively establishing wireless communication between the local internal telephonic unit and a selected on of the remote internal telephonic units.

36. A method of distributing calls from external telephonic units of an external telephonic network with internal telephonic units of an automatic call distributor having a multiport switch, comprising the steps of:
establishing communications between the external telephonic units and the internal telephonic units through the multiport switch;
selectively associating signals relating the functioning of the multiport switch with a data port of a central processing unit of the call distributor;
wireless transceiving signals between the preselected data port and a remote station to establish a wireless communication link between the preselected data port and a remote data terminal at the remote location; and
multiplexing the signals before being transceived to simultaneously establish a wireless communication link between the data port and a plurality of remote internal data terminals at the remote location.

37. The method of claim 36 including the steps of
selectively associating signals of a call from external telephonic units at the multiport switch with a preselected communication port, and
wireless transmitting signals between the preselected communication port and the remote station to establish a wireless communication link between the external telephonic unit and a remote telephonic unit at the remote station.

38. The method of claim 37 including the step of multiplexing the signals transceived between the communication port and the remote station to simultaneously establish a wireless communication link between a plurality of remote internal telephonic units and a plurality of external telephonic units, respectively.

39. The method of claim 36 in which said step of wireless transceiving is performed by transceiving radio waves.

40. The method of claim 39 in which the step of radio transmitting is performed by radio wave transmitting on a spread spectrum basis.

41. The method of claim 36 including the step of selectively establishing wireless communication between the one and the other remote data terminals through the multiport switch.

42. The method of claim 41 including the step of respectively associating with different data ports of the central processing unit and said communication between the one and the other remote data terminals passing through said different data ports.

43. The method of claim 41 including the step of associating with the selected one of the data ports and said communication between the one and the other remote data terminals passing through the selected one of the data ports.

44. The method of claim 36 including the steps of:
connecting a local data terminal line with a data port of the central processing unit, and
selectively establishing wireless communication between the remote data terminal and another remote data terminal at a remote location.

45. An automatic call distributor, comprising:

a central processing unit having at least one data port;

a multiport switch controlled by the central processing unit, the multiport switch having a plurality of communication ports through which communication links are established with external telephonic units of an external telephonic network coupled with the multiport switch;

a remote internal telephonic unit at a remote location;

a remote data terminal at the remote location;

means for selectively establishing wireless communication between the remote internal telephonic unit and one of the external telephonic units through a selected one of the communication ports of the multiport switch and for selectively establishing wireless communication between the remote data terminal and the multiport switch through a selected one of the at least one data port of the central processing unit, the means for selectively establishing wireless communication with the remote telephonic unit and the remote data terminal including a remote transceiver at the remote location for sending and receiving radio waves, and remote time division multiplexing equipment at the remote location switching means including means for demultiplexing signals received by the remote transceiver before being provided to the remote units, and means for multiplexing signals from the plurality of remote units before being sent by the transceiver.

46. The automatic call distributor of claim 45 including a plurality of other remote data terminals located together with the one remote data terminal to form a group of remote data terminals, and in which said wireless communication establishing means includes means at the remote location connected with the group of remote data terminals for selectively establishing a communication link between any of the plurality of remote data terminals and the computer controlled multiport switch on a time division multiplexing basis.

47. The automatic call distributor of claim 45 in which said wireless communication establishing means includes means at the local location connected with the multiport switch for establishing a wireless communication link between a plurality of local data terminals connected to the multiport switch and the remote data terminal on a time division multiplexing basis.

* * * * *